US012730631B2

(12) United States Patent
Eastman et al.

(10) Patent No.: US 12,730,631 B2
(45) Date of Patent: Sep. 8, 2026

(54) SELECTIVE DEPLOYMENT OF SOFTWARE BASED ON VERSIONING SCHEMA

(71) Applicant: Cisco Technology, Inc., San Jose, CA (US)

(72) Inventors: Mark Edward Eastman, Holly Springs, NC (US); Donald Mark Allen, Colorado Springs, CO (US); Jeffrey C. Clark, Cary, NC (US); Terence James Boldt, Oakville (CA); John William Hayduk, Chapel Hill, NC (US); Mark William Emeis, Monument, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 268 days.

(21) Appl. No.: 18/495,059

(22) Filed: Oct. 26, 2023

(65) Prior Publication Data

US 2025/0138814 A1 May 1, 2025

(51) Int. Cl.
*G06F 8/71* (2018.01)
*G06F 8/61* (2018.01)

(52) U.S. Cl.
CPC . *G06F 8/71* (2013.01); *G06F 8/61* (2013.01)

(58) Field of Classification Search
CPC .................................... G06F 8/61; G06F 8/71
See application file for complete search history.

(56) References Cited

U.S. PATENT DOCUMENTS

| | | | | |
|---|---|---|---|---|
| 7,389,341 B2 * | 6/2008 | Cornelius | H04L 41/082 370/242 |
| 7,506,336 B1 * | 3/2009 | Ninan | G06F 8/65 707/999.203 |
| 8,739,150 B2 * | 5/2014 | Gass | G06F 8/36 717/173 |
| 9,075,695 B2 * | 7/2015 | Pei | G06F 8/65 |
| 9,535,685 B1 * | 1/2017 | Wang | G06F 8/61 |
| 11,586,436 B1 | 2/2023 | Jennings | |
| 11,675,579 B2 * | 6/2023 | Gupta | G06F 8/65 717/172 |
| 2004/0093593 A1 * | 5/2004 | Jhanwar | G06F 8/71 717/169 |
| 2005/0210466 A1 * | 9/2005 | Carter | G06F 8/61 713/100 |
| 2010/0185595 A1 * | 7/2010 | Gopalakrishnan | G06F 16/219 707/E17.017 |

(Continued)

OTHER PUBLICATIONS

Calver, "Calendar Versioning," Timely Project Versioning, https://calver.org/, Jul. 1, 2019, 8 pages.

(Continued)

*Primary Examiner* — Douglas M Slachta
(74) *Attorney, Agent, or Firm* — Edell, Shapiro & Finnan, LLC

(57) ABSTRACT

A method, computer system, and computer program product are provided for deploying software using a versioning schema. An n-dimensional string is obtained that describes a version of a component, wherein a value for each dimension describes a particular feature of the component. The n-dimensional string is analyzed using a template to determine each feature of the component. It is determined whether to deploy the version of the component based on the analyzing and based on criteria related to one or more features of the component.

20 Claims, 8 Drawing Sheets

(56) References Cited

U.S. PATENT DOCUMENTS

| | | | | |
|---|---|---|---|---|
| 2010/0228750 | A1* | 9/2010 | Solin | G06F 16/1734 707/755 |
| 2011/0265073 | A1* | 10/2011 | Vidal | G06F 8/65 717/170 |
| 2013/0047139 | A1 | 2/2013 | Bolton et al. | |
| 2015/0339278 | A1 | 11/2015 | Bao et al. | |
| 2017/0212921 | A1* | 7/2017 | Wu | G06F 16/23 |
| 2018/0157486 | A1* | 6/2018 | Bezzi | G06F 8/71 |
| 2020/0351383 | A1* | 11/2020 | Jayaraman | G06F 18/23 |
| 2025/0298597 | A1* | 9/2025 | Alluboyina | G06F 8/63 |

OTHER PUBLICATIONS

Cisco, "CX Cloud Release Notes May 2023," https://www.cisco.com/c/en/us/support/docs/cx/cx-cloud/cx220472-cx-cloud-release-notes-may-2023.html, May 23, 2023, 3 pages.

GS1 US, "UPC, Barcodes & Prefixes," The Global Language of Business, retrieved from https://www.gs1us.org/upcs-barcodes-prefixes, Oct. 12, 2023, 3 pages.

Bariatric Advantage, "Multivitamins Comparison," Nutritional Products, retrieved from https://www.bariatricadvantage.com/multivitamins-comparison, Oct. 12, 2023, 1 page.

Preston-Werner, T., "Semantic Versioning 2.0.0," retrieved from https://semver.org/, Oct. 12, 2023, 7 pages.

Wikipedia, "QR Code," https://en.wikipedia.org/wiki/QR_code, Oct. 25, 2023, 30 pages.

Wikipedia, "Release Notes," https://en.wikipedia.org/wiki/Release_notes, Sep. 26, 2023, 5 pages.

* cited by examiner

SELECTIVE DEPLOYMENT OF SOFTWARE BASED ON VERSIONING SCHEMA

TECHNICAL FIELD

The present disclosure relates generally to versioning schemas, and more specifically, to the selective deployment of software based on a versioning schema.

BACKGROUND

Software versioning schemas are structured systems used to assign unique identifiers to software releases, facilitating the tracking and management of a program's or system's life cycle. These schemas may typically consist of a series of numbers that are organized in a specific format. For example, many versioning schemas, such as semantic versioning, follow a pattern such as "X.Y.Z," where the first digit represents a major version of the software, the second digit indicates a minor version, and the third digit may represent a patch or maintenance version. Software versioning schemas thus help users understand the significance of updates, and aid developers in managing software development and maintenance in order to ensure compatibility between different versions of a program. However, there is no universal consensus for determining whether an update constitutes a major update versus a minor update, and versioning schemas can differ from one developer to another. Existing versioning schemas tend to provide a general approach to change that does not consider how various consumers might be differently impacted by the change. Thus, conventional versioning schemas are not very helpful at conveying specific change information to a user since conventional versioning schemas do not provide the context to understand the types of changes that are indicated by a version string.

DETAILED DESCRIPTION

Overview

Figure 1:
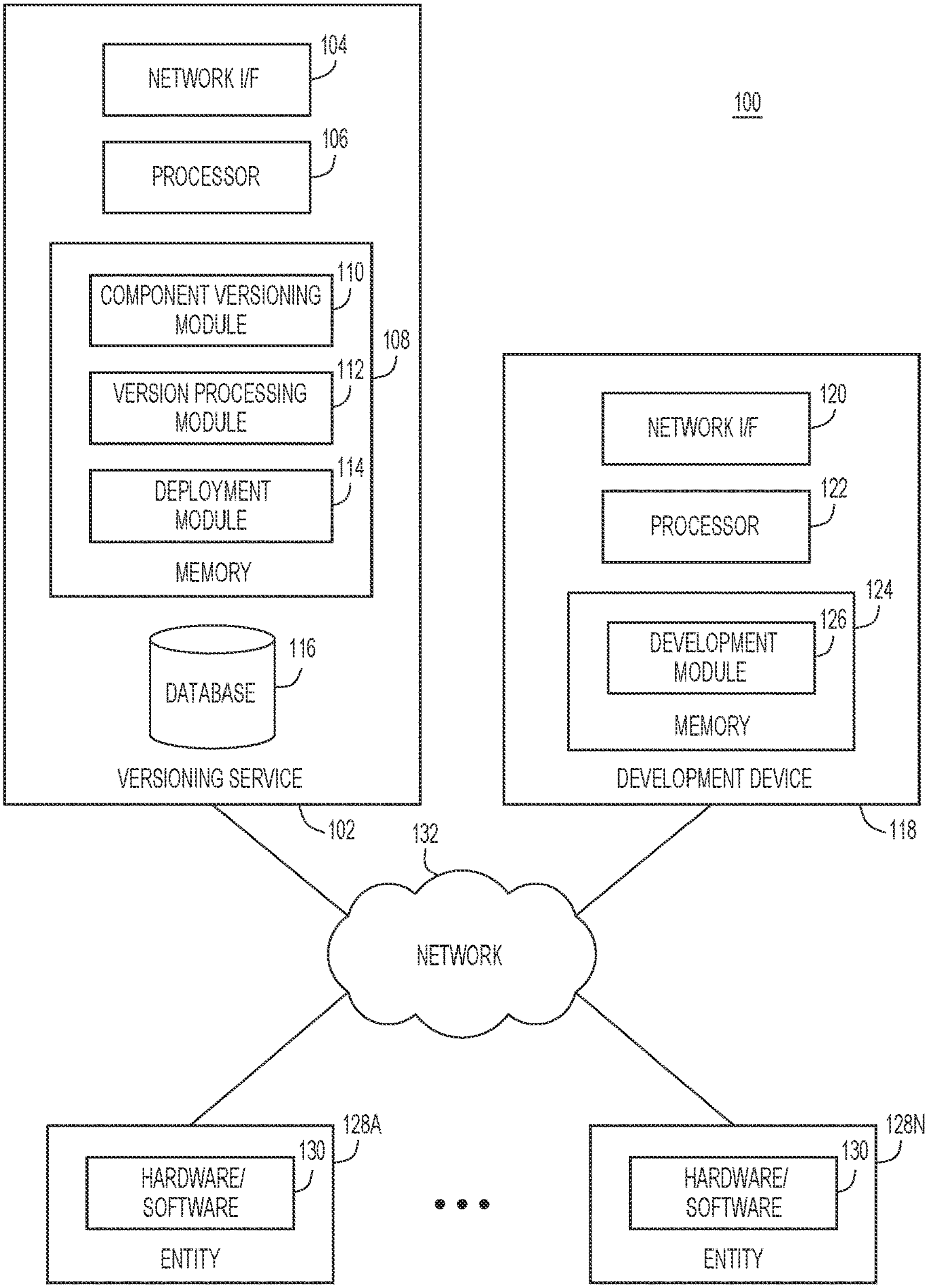
FIG. 1 is a block diagram of a network environment for deploying software based on a versioning schema, according to an example embodiment.

According to one embodiment, techniques are provided for deploying software using a versioning schema. An n-dimensional string is obtained that describes a version of a component, wherein a value for each dimension describes a particular feature of the component. The n-dimensional string is analyzed using a template to determine each feature of the component. It is determined whether to deploy the version of the component based on the analysis and based on criteria related to one or more features of the component.

Example Embodiments

Present embodiments relate to versioning schemas, and more specifically, to the selective deployment of software based on a versioning schema. Products such as software can have a high degree of complexity, as the design, manufacture, distribution, and support aspects can create a web of dependencies. These dependencies can result in significant impact to an organization's operations when a change to a product occurs. Due to the variability of the types of changes that can and do occur, an organization should be vigilant when any change occurs so that the nature of the change can be determined, as well as the potential impact that a change may have on the organization's operations. Conventional methods for change notifications have taken the form of version changes to different documents or components of a product. Unfortunately, when there is a new version of a product, this change typically requires some level of manual review and assessment prior to deploying the new version of the product.

Product versions are a common method used to identify specific releases of a product. New product versions can be generated for several reasons: new functionality, enhancements to existing functionality, security improvements made to a product, bug fixes, and the like. Since many factors can trigger a new version of a product, consumers of the change will want to understand the nature of the update before using the updated version. There could be extensive costs in time, money, or risk associated with adopting new versions of a product. Therefore, versions with minor, insignificant, or unaffecting changes can often be skipped. Some products may have frequent updates making it unrealistic, frustrating, or cost prohibitive for users to apply every change. In these cases, users review the significance of the updates before determining the need for the update. Conventional forms of versioning, including semantic and calendar versioning, do not provide insight into the nature of the changes without having to reference source material containing details about the new version. Thus, conventional versioning schemas can make it difficult, if not impossible, to programmatically and consistently know when an updated version is needed.

To address this problem, the embodiments presented herein provide an improved approach to versioning in which information is included in a product version itself in order to self-describe the nature and/or degree of changes in a specific version of a product. Users of a product can then use this information to determine the impact of a change to a product, and can determine whether to deploy the product based on the impact. In particular, the embodiments presented herein provide an n-dimensional versioning schema that includes a value for each dimension that describes a particular feature of a product; a template can be used to look up the particular features using the values in the n-dimensional string. Using an n-dimensional string versioning schema, users can evaluate whether to apply an updated version of a product based on their specific requirements, including their configurations (e.g., computing environments), interests, and use-cases.

Thus, present embodiments improve the technical field of software automation with respect to computing and/or networking environments. In particular, present embodiments provide a versioning schema that enables any quantitative and/or qualitative information about a version of a product to be encoded in an n-dimensional string that can be analyzed to obtain this information and, based on the information, make intelligent and automatic decisions regarding the deployment of software. Thus, present embodiments provide the practical application of automating the process of configuring and/or upgrading software. Moreover, a version of a product can be selectively accepted based on user criteria, enabling certain versions to be variously utilized or skipped. This selective deployment of software can be fully automated, and therefore increases the efficiency of computing resource utilization by reducing processing, memory, and/or storage resource consumption when a version of a product is identified as unnecessary for a particular use-case. For example, an intellectual capital (IC) code module system, which includes individual code modules for automated issue identification and remediation in a computing or networking system or environment, can programmatically determine the need to download an updated IC package by leveraging information contained in the version string: if changes occur to certain libraries that are not used by a user, the new IC package can be ignored, thereby avoiding unnecessary processing and IC engine downtime.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

FIG. 1 is a block diagram in which a network environment 100 for deploying software based on a versioning schema, according to an example embodiment. As depicted, network environment 100 includes a versioning service 102, a development device 118, and a plurality of entities 128A-128N that are in communication via a network 132. It is to be understood that the functional division among components has been chosen for purposes of explaining various embodiments and is not to be construed as a limiting example. A user of development device 118 may develop components that are versioned using versioning service 102 and can be distributed to entities 128A-128N.

Versioning service 102 includes a network interface (I/F) 104, at least one processor (computer processor) 106, memory 108 (which stores instructions for a component versioning module 110, a version processing module 112, and a deployment module 114), and a database 116. In various embodiments, versioning service 102 may include a rack-mounted server, laptop, desktop, smartphone, tablet, or any other programmable electronic device capable of executing computer readable program instructions. Network interface 104 enables components of versioning service 102 to send and receive data over a network, such as network 132. Versioning service 102 may be utilized to generate n-dimensional version strings for components and templates that are used to determine the particular features of each component.

Component versioning module 110, version processing module 112, and deployment module 114 may include one or more modules or units to perform various functions of the embodiments described below. Component versioning module 110, version processing module 112, and deployment module 114 may be implemented by any combination of any quantity of software and/or hardware modules or units, and may reside within memory 108 of versioning service 102 for execution by a processor, such as processor 106.

Component versioning module 110 may generate n-dimensional version strings for components, such as code modules or other executable software. Each version string may include a plurality of portions, such as a component name (indicating a name of the component), a template identifier (identifying a particular template for looking up the features of the component), and a number of values that can be used to determine the specific features of the component via the component's template. In various embodiments, a string may include special characters separating one or more of the portions, such as an at sign ("@"), ampersand ("&"), punctuation like a comma, period, colon, or semicolon, or any other character or group of characters. N-dimensional version strings are depicted and described in further detail below with reference to FIGS. 2 and 3.

In some embodiments, a user may submit a template for a component and information describing the component's features, which component versioning module 110 processes in order to generate a version string. A template can include a number of categories and available options for each category, with each option being assigned a particular value in the template. For example, a category may include two different options, with one being assigned a value of "0" and another being assigned a value of "1." A "1" can indicate that a feature is changed whereas a "0" can indicate that a feature is unchanged. As another example, a category may include four different options, which can be assigned values of "A," "B," "C," and "D." The template designer may not be limited to using numerical values, and can use any letters, numbers, characters, strings, etc., to represent the values. For example, a template with four categories which include a binary zero or one for indicating a change or no change, along with other values for types of changes, is illustrated in Table 1 below:

TABLE 1

| Category 1 | Category 2 | Category 3 | Category 4 |
|---|---|---|---|
| 0 (No Change) | 0 (No Change) | 0 (No Change) | 0 (No Change) |
| 1 (Change) | 1 (Change) | 1 (Change) | 1 (Change) |
| ABC (Type of Change) | 2BVE (Type of Change) | BCG (Type of Change) | 2345 (Type of Change) |
| XYZ (Type of Change) | BCH(Type of Change) | 334 (Type of Change) | 3CV (Type of Change) |
| RG12 (Type of Change) | G423 (Type of Change) | | 245 (Type of Change) |

In some embodiments, rather than obtaining a user-defined template, component versioning module 110 generates a template automatically based on input from a user that indicates the possible features for each category of a product. Component versioning module 110 can then assign a value to each possible feature for each category in order to define a template for the component. Whether a template is user-defined or automatically generated, component versioning module 110 can generate a version string for a particular version of a component using the component's template. Component versioning module 110 can be provided with the specific features of a component, and using a template, component versioning module 110 can determine the values for each feature and output a string in which each dimension includes a value defining a particular feature. Component versioning module 110 may also insert a reference in the string that indicates a name of a template that is used for evaluating a component's version string; this template indicator may further indicate a specific version of a template.

Version processing module 112 may process n-dimensional version strings in order to determine the features of a component using a template. Initially, version processing module 112 may receive n-dimensional strings as input from a computing device, such as development device 118 or any computing devices of entities 128A-128N. Version processing module 112 may parse a version string to extract the template identifier for the component. Using the template identifier, version processing module 112 can obtain the appropriate template for a version string, and using the value for each dimension of the string, use the template to look up each specific feature of the component that is described by the component's version string. Version processing module 112 can provide a list of features for a component to the requesting entity (e.g., development device 118 or any computing devices of entities 128A-128N) that provided the version string. In some embodiments, version processing module 112 provides a list of features for a component to deployment module 114 for further processing.

Deployment module 114 may analyze data including the features of a component and criteria for deploying the component to an entity such as a computing system, computing network, network device, communication network, and/or any other entity. The criteria can be defined by a user or organization, and can include a list of any features that the user or organization requires or does not require for deploying the component. In some embodiments, the criteria can indicate any approved feature, any denied feature, and/or any irrelevant feature. Thus, based on an entity's criteria, deployment module 114 can determine whether a component should be deployed to the entity. For example, a component may only be deployed to an entity if the component satisfies one or more required features, or if the component does not include any denied features. In some embodiments, a component will not be deployed if the changes to the features in the component, as compared to a previous version of the component, only include changes that are not stipulated as required by an entity's criteria. Thus, for example, if an intellectual capital code module's version string indicates that the code module includes changes to the documentation but not to the underlying executable code, then an organization may bypass the code module and continue using a previous version, thus skipping the process of deploying the code module by updating any relevant computing or networking devices of the entity. In some embodiments, deployment module 114 receives a version string of a component from an entity (e.g., any of entities 128A-128N) and evaluates the version string against the entity's criteria; if the version string satisfies all of the relevant criteria, then deployment module 114 can transmit instructions to the entity to cause the entity's computing and/or networking devices to be updated to include the component.

Database 116 may include any non-volatile storage media known in the art. For example, database 116 can be implemented with a tape library, optical library, one or more independent hard disk drives, or multiple hard disk drives in a redundant array of independent disks (RAID). Similarly, data stored in database 116 may conform to any suitable storage architecture known in the art, such as a file, a relational database, an object-oriented database, and/or one or more tables. Database 116 may store data including templates, version strings, and/or entity criteria for deploying components.

Development device 118 includes a network interface (I/F) 120, at least one processor (computer processor) 122, and memory 124 (which stores instructions for a development module 126). In various embodiments, development device 118 may include a rack-mounted server, laptop, desktop, smartphone, tablet, or any other programmable electronic device capable of executing computer readable program instructions. Network interface 120 enables components of development device 118 to send and receive data over a network, such as network 132. Development module 126 may include one or more modules or units to perform various functions of the embodiments described below. Development module 126 may be implemented by any combination of any quantity of software and/or hardware modules or units, and may reside within memory 124 of development device 118 for execution by a processor, such as processor 122.

A developer may interact with development module 126 of development device 118 to create various components that can be versioned in accordance with present embodiments. In various embodiments, development module 126 can include tools such as text editors or integrated development environments (IDEs) for code writing and management, version control systems (VCS) to track code changes, package managers, automation tools for compilation and testing, debugging tools, code linters and analyzers, testing frameworks, code documentation generators, and the like. When a component is designed using development module 126, the developer can transmit a request to versioning service 102 to generate a template and/or version string for the component. As such, the request may define any particular features of the component, changes to the component from a previous version, and the like.

Entities 128A-128N may each include various hardware and/or software (hardware/software 130) for performing various computing and/or networking-related functions. Each entity 128A-128N may correspond to a user, a group of users (e.g., an organization), a service (e.g., a cloud platform), a computing device, and the like, and can include one or more computing devices and/or networking devices configured to perform any desired tasks. Entities 128A-128N may selectively deploy components (e.g., code modules) to computing and/or networking devices. In some embodiments, version processing module 112 and/or deployment module 114 may be included in any of entities 128A-128N. Deploying the components may include installing components (e.g., executable software) on one or more devices, updating previously-installed components, adding code modules to a library, replacing one or more preexisting code modules in a library with updated versions of those code modules, and the like.

Network 132 may include a local area network (LAN), a wide area network (WAN) such as the Internet, or a combination of the two, and includes wired, wireless, or fiber optic connections. In general, network 132 can be any combination of connections and protocols known in the art that will support communications between versioning service 102, development device 118, and/or entities 128A-128N via their respective network interfaces in accordance with the described embodiments.

Figure 2:
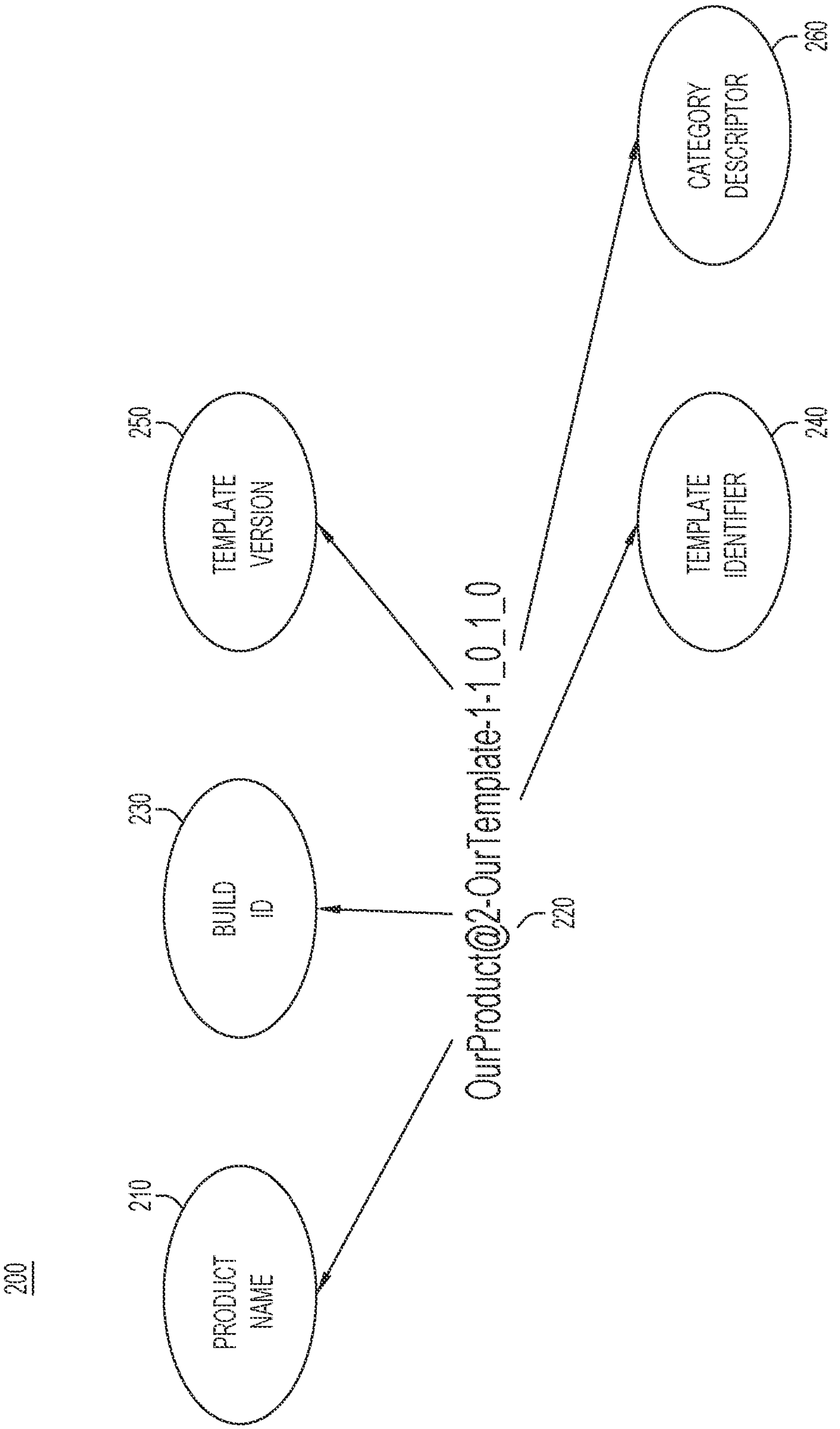
FIG. 2 is a diagram depicting a version string, according to an example embodiment.

FIG. 2 is a diagram depicting a version string 200, according to an example embodiment. As depicted, version string 200 includes different portions, including a product name 210, a separator 220, a build identifier 230, a template identifier 240, a template version 250, and a category descriptor 260. In various embodiments, it should be appreciated that some of these portions may be omitted; for example, if a version string is inserted into, or otherwise associated with a component, the product name 210 portion may not be necessary. Similarly, in some embodiments in which there is only one version of each template, a template version 250 portion may be omitted. Separator 220 and other separating punctuation (e.g., the hyphens in version string 200) may be omitted.

Product name 210 may indicate a name for a particular component, which can be a name that is inclusive to multiple different versions of the component. It should be understood that product name 210 may not necessarily describe a product, and can also describe a library, a subcomponent, an application, and the like. Separator 220 may be an extended character or other particular character or group of characters that can make version string 200 more readable by separating product name 210 from the rest of version string 200. Build identifier 230 may be a unique identifier that is associated with the combination of values recites in category descriptor 260. Thus, category descriptor 260 identifies how a build (e.g., the build identified by build identifier 230) of OurProduct differs from a previous release. Build identifier 230 can therefore be used to shorten a version string in embodiments in which the values for category descriptor 260 can be obtained from a database that stores associations between particular values for category descriptor 260 and values for build identifier 230.

Template identifier 240 may identify a particular template that is used for looking up the values found in category descriptor 260 to determine the particular features of a component. A database may store templates and associations between templates and template identifiers. Template version 250 may indicate a specific version of a template that may be used to look up the values found in category descriptor 260. Thus, multiple versions of templates may be associated with a component. For example, one version of a template may be used with a version of a component that supports one language or region, and another template may be used with a similar version of the component that supports another language or region.

Category descriptor 260 may include values, which can be separated by delimiters (underscores in the depicted embodiment), that are used in conjunction with a template to determine the particular features of a component. In the depicted example, version string 200 includes values of "1," "0," "1," and "0." Table 2, below, shows an example of a template that can be used to determine features of the component described by version string 200:

TABLE 2

| Category 1 | Category 2 | Category 3 | Category 4 |
|---|---|---|---|
| 0 (No Change) | 0 (No Change) | 0 (No Change) | 0 (No Change) |
| 1 (Change) | 1 (Change) | 1 (Change) | 1 (Change) |

Thus, an analysis of the values found in category descriptor 260 of version string 200 indicates that there is a change (e.g., as compared to a previous version) to Category 1 and Category 3 of the component, and no change to Category 2 and Category 4. Templates can also indicate a type of change at a more granular level. Table 3 below shows another example of a template:

TABLE 3

| Category 1 | Category 2 | Category 3 | Category 4 |
|---|---|---|---|
| 0 (No Change) | 0 (No Change) | 0 (No Change) | 0 (No Change) |
| 1 (Change) | 1 (Change) | 1 (Change) | 1 (Change) |
| 2 (Type of Change) | 2 (Type of Change) | 2 (Type of Change) | 2 (Type of Change) |
| 3 (Type of Change) | 3 (Type of Change) | 3 (Type of Change) | 3 (Type of Change) |
| 4 (Type of Change) | 4 (Type of Change) | | 4 (Type of Change) |

Thus, specific types of changes can be indicated in a table. As shown in Table 3, Category 3 does not include more than two specific types of changes, so there is a blank cell. Continuing with the example of Table 3, a category descriptor 260 may include values of "0," "2," "1," and "4" for a component that has no change to Category 1, Type of Change 2 to Category 2, an unspecified change to Category 3, and Type of Change 4 to Category 4; these values result in a body of "0_2_1_4" for the category descriptor 260 of a resulting version string.

Figure 3A:
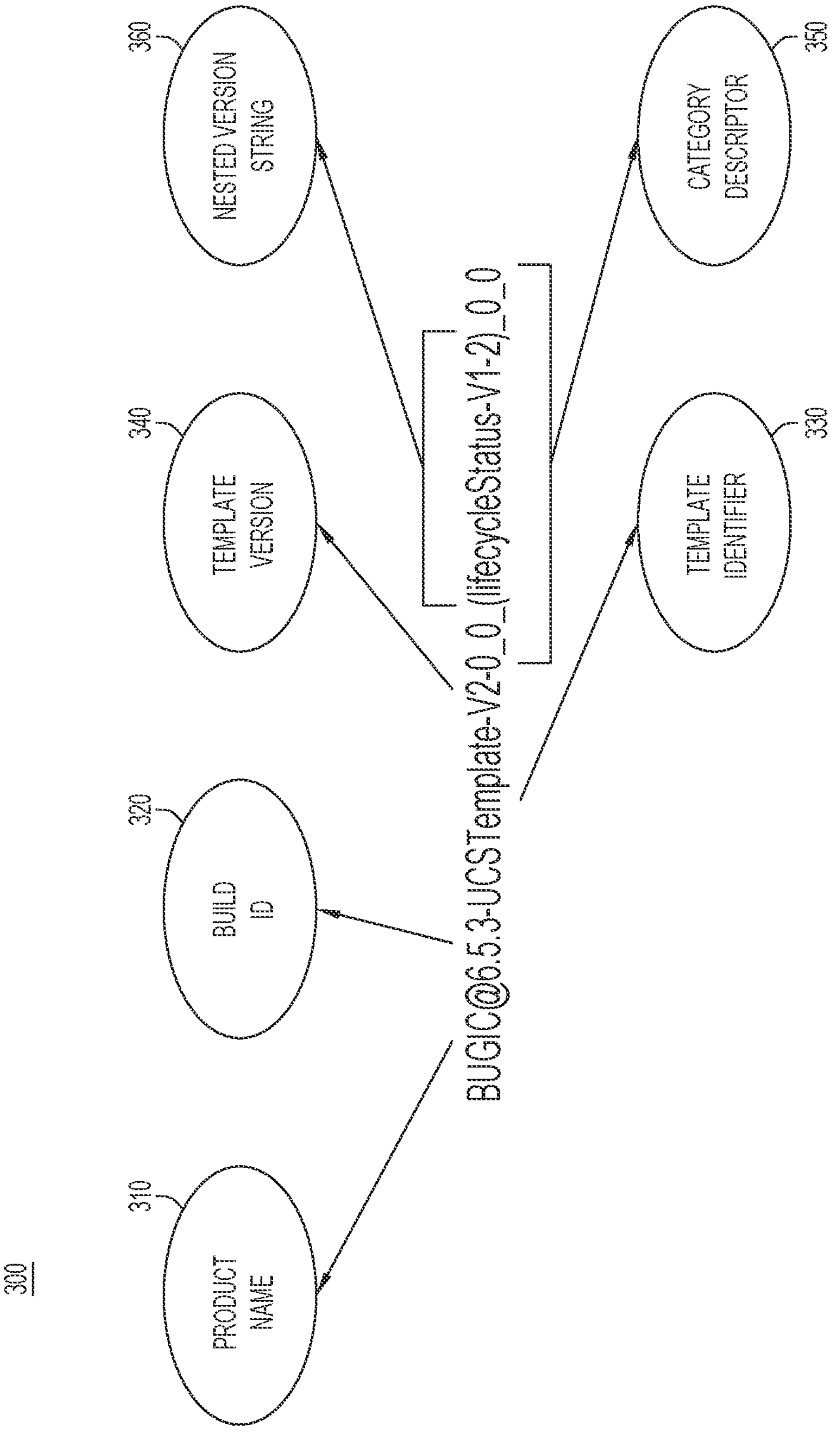
FIG. 3A is a diagram depicting a version string, according to an example embodiment.

With reference now to FIG. 3A, a diagram is shown depicting a version string 300, according to an example embodiment. As depicted, version string 300 includes a product name 310, a build identifier 320, a template identifier 330, a template version 340, and a category descriptor 350. Further, category descriptor 350 includes a nested version string 360. Product name 310 may provide a name for the component, which can be applied to multiple versions of the component, and build identifier 320 may be a unique character or string that represents the release of a product. Template identifier 330 may include a value for identifying the template for processing the values in category descriptor, and template version 340 may further specify a particular version of the template.

Category descriptor 350 of version string 300 includes nested version string 360, which is another version string. By nesting a version string inside of another version string, a subcomponent of a component can be described. In category descriptor 350, there are values, separated by delimiters (e.g., underscores), of "0," "0," "lifecycleStatus-V1-2," "0," and "0." In some embodiments, a nested version string may include other delimiters to indicate that it is a version string rather than a value for a particular feature of a component; in the depicted embodiment, parentheses are used as delimiters to indicate that "lifecycleStatus-V1-2" is a nested version string. Thus, the template identified by template identifier 330 ("UCSTemplate") can be used to determine the particular features for category descriptor 350, except for nested version string 360, which may utilize its own template. In the depicted example, nested version string 360 includes template identifier "lifecycleStatus," template version "V1", and category descriptor having a single value "2", and thus, version 1 ("V1") of its template ("lifecycleStatus") can be used to look up the feature associated with value "2".

Figure 3B:
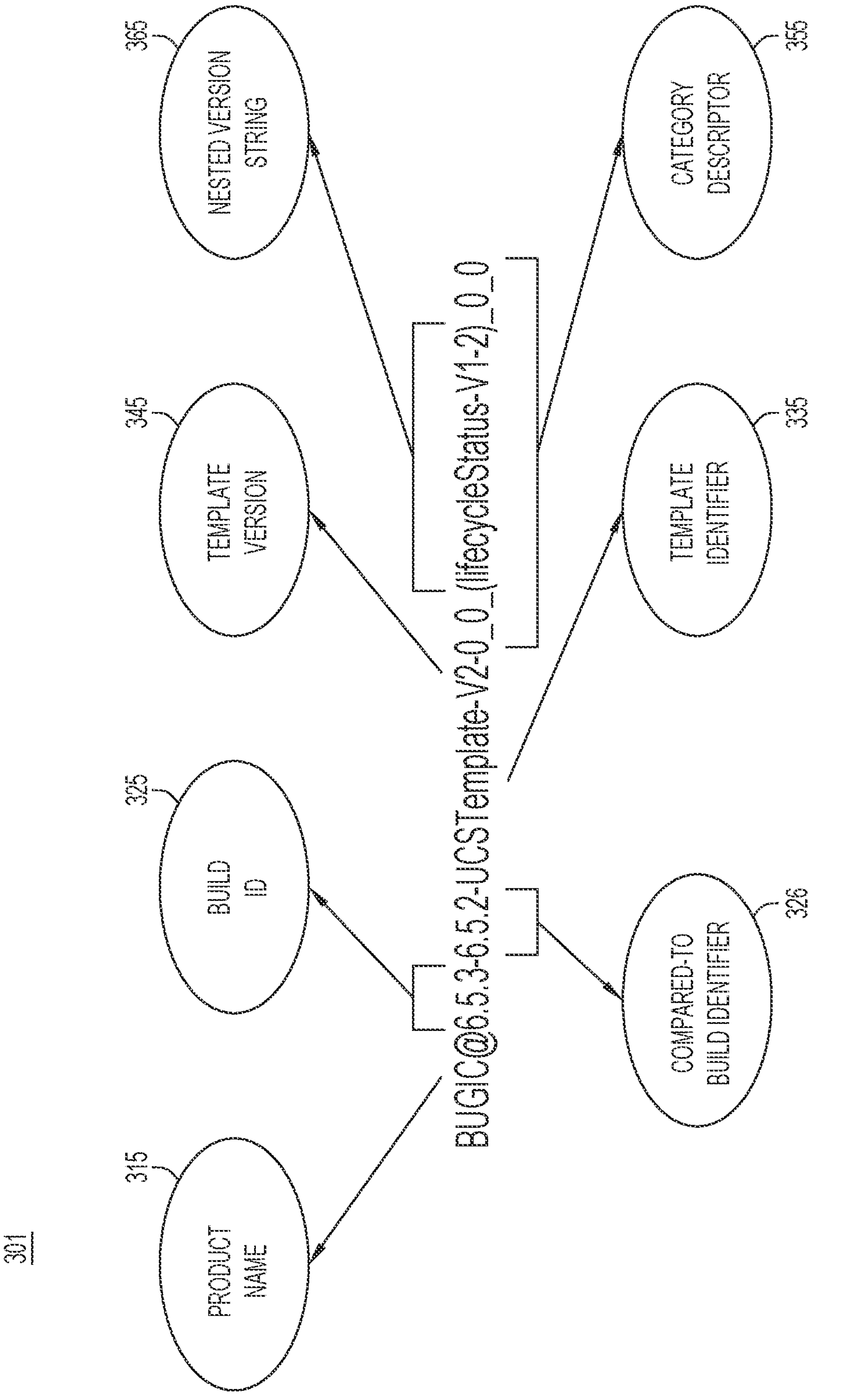
FIG. 3B is a diagram depicting a version string, according to an example embodiment.

With reference now to FIG. 3B, a diagram is shown depicting a version string 301, according to an example embodiment. As depicted, version string 301 includes a product name 315, a build identifier 325, a compared-to build identifier 326, a template identifier 335, a template version 345, and a category descriptor 355. Further, category descriptor 355 includes a nested version string 365. The compared-to build identifier 326 may indicate that version string 301 represents changes with reference to a specific other version of the product (e.g., the version associated with a build identifier of 6.5.2). This enables the component developer to create multiple n-dimensional version strings comparing the current component build to one or more previous component builds. Thus, a developer can address different branches of software development. For example, if component A reaches a major milestone, the maintainers may change the major version number (i.e., 2.3.1 may become 3.0.0). However, work may continue on the previous branch for issues such as security fixes. Embodiments that include a compared-to build identifier 326 enable a new version of a release of 3.x.x to be compared to other 3.x.x-1 releases as well as 2.3.x+1 releases.

In various embodiments, the values indicated by category descriptor 355 can include manufacturing or development locations (e.g., using country codes like "US" and "UK" or placeholder values associated with specific regions). In various embodiments, the values in category descriptor 355 can include hash values, as described with reference to Table 10 below.

Figure 4:
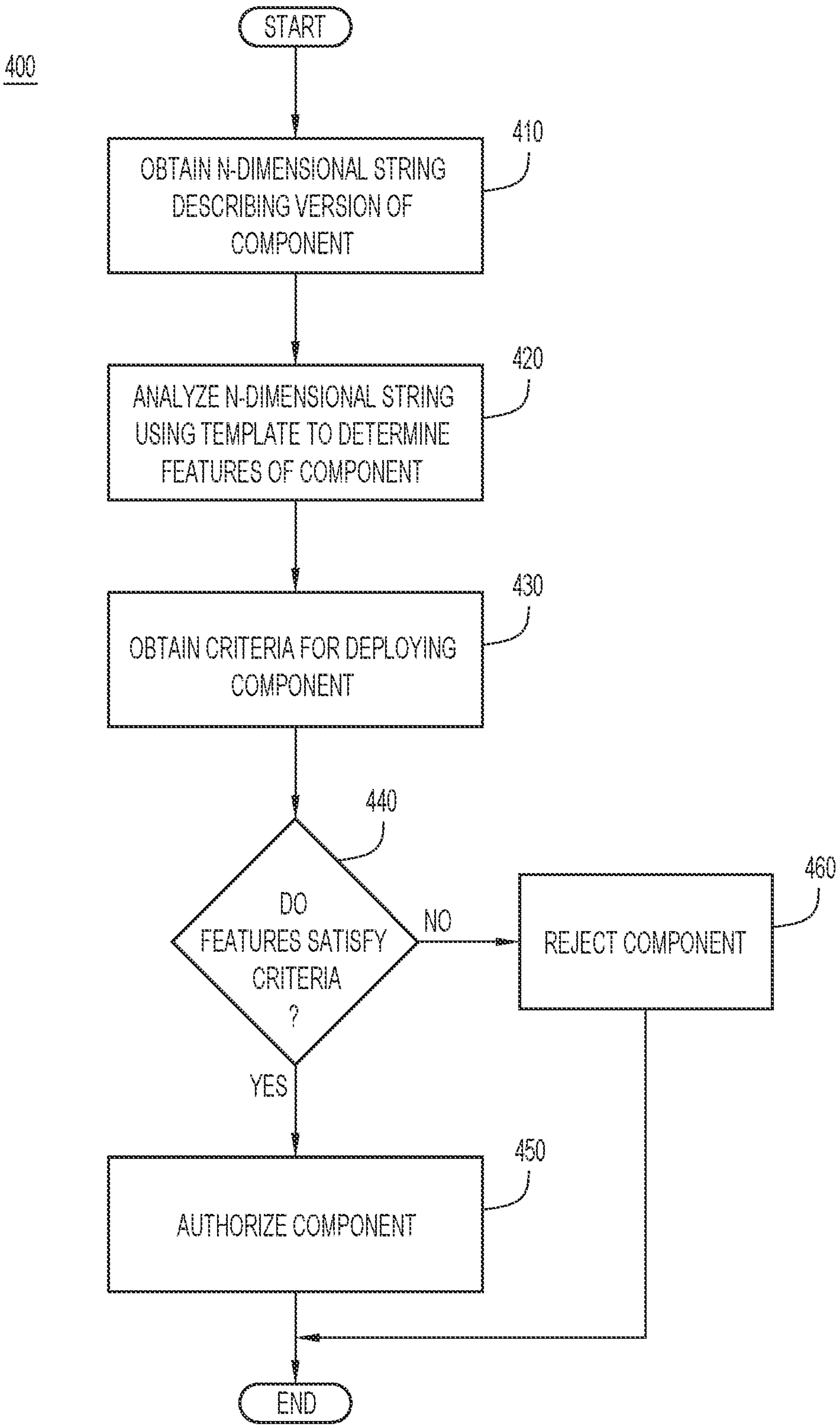
FIG. 4 is a flow chart of a method for selectively deploying components to entities using a versioning schema, according to an example embodiment.

With reference to FIG. 4, a flow chart is provided of a method 400 for selectively deploying components to entities using a versioning schema, according to an example embodiment.

An n-dimensional string is obtained that describes the version of a component at operation 410. The n-dimensional string may include at least a portion that identifies a template to be used for determining features based on values for each dimension of a portion of the n-dimensional string that describes the features of the component.

The n-dimensional string is analyzed using a template to determine features of the component at operation 420. The template may include a listing of possible values for each dimension of the n-dimensional string, and specific features of the component that are associated with each value. As an example, a component can include an intellectual capital (IC) package, which is a collection of digitized knowledge that includes code modules that, when executed, perform issue identification and remediation tasks in a computing or networking system/environment. An IC package can thus include thousands of individual code modules, so if there is a new version of an IC package available, the embodiments presented herein can be applied to analyze an IC package's version string in order to automate the process of determining whether to deploy the IC package to a particular entity (e.g., a computing or networking system/environment).

An example n-dimensional version string for an IC package may be:

BPP@23-osType-1-1_0 which indicates that the component name is "BPP," the build identifier is "23," the template identifier is "osType," the template version is "1," and the two-dimensional category descriptor includes the values of "1" and "0." The template corresponding to version 1 of template "osType" is shown in Table 4 below:

TABLE 4

| Network | Other |
|---|---|
| 0 (No Change)<br>1 (Change) | 0 (No Change)<br>1 (Change) |

As shown, this template includes the categories of "Network" and "Other." The "Network" category can indicate a change status to a network operating system, and the "Other" category can indicate a change status to a different aspect of an entity's configuration. The category descriptor of "1_0" indicates that there is a change to a network aspect of this IC package, and no change to an "Other" aspect. Thus, it can be determined that one or more IC code modules that are written to devices that use one of the network operating systems were either added, modified, or removed in this build as compared to the previous build (the build preceding Build 23, so Build 22 in this example).

An entity that manages an installation of only firewalls, for example, does not need to download and install this IC package, and more importantly, does not need to re-run any of the IC code modules in this package, because the n-dimensional version string indicates that there is no change relating to firewalls in this package. Since a new version of an IC package can be released soon after the previous version (e.g., in a matter of days), the present embodiments enable many newer releases to be skipped over, so that new version may only be accepted (and re-scans performed) much less frequently (e.g., monthly).

As another example, an n-dimensional version string for an IC package may be:

BPP@39-osType-1-(severity-1-0_0_1)_0 which is a version string that includes a nested version string ("severity-1-0_0_1"). The full string indicates that the component name is "BPP," the build identifier is "39," the template identifier is "osType," the template version is "1," and the two-dimensional category descriptor includes a nested string and another category having a value "0." The parent string indicates a template identifier of "osType" corresponding to version 1 of that template, which is shown in Table 5 below:

TABLE 5

| Network | Other |
|---|---|
| 0 (No Change)<br>severity-1 | 0 (No Change)<br>severity-1 |

As shown, this template again indicates categories of "Network" and "Other," with the options of "0 (No Change)" or "severity-1." Version 1 of the "severity" sub-template is shown in Table 6 below:

TABLE 6

| High | Medium | Low |
|---|---|---|
| 0 (No)<br>1 (Yes) | 0 (No)<br>1 (Yes) | 0 (No)<br>1 (Yes) |

Table 6 may be generated by a developer to indicate the importance of the IC package itself; for example, an IC package marked with a "High" severity may check for exposure to a security vulnerability that a configuration change could mitigate. Alternatively, an IC package marked with a "Low" severity may check for configurations that are valid but difficult to maintain. Continuing with the example of version string "BPP@39-osType-1-(severity-1-0_0_1)_0," this string indicates that one or more IC code modules for networking devices were added, modified, or deleted in build 39 of component "BPP", and that no changes were made to ICs of any non-network operating system types. In particular, using the sub-template, it can be determined that the change(s) to the network operating system is/are a "Low" severity type. Thus, an entity that is only concerned with high severity issues may bypass this update and may not re-run any scans.

As another example, an n-dimensional version string for an IC package may be:

BPP@51-osType-1-(severity-1-(changeType-1-0_1)_0_(changeType-1-0_1))_0 which is a version string that includes a nested category descriptor ("severity-1-0_1") and a template that includes a nested templates (changeType). The full string indicates that the component name is "BPP," the build identifier is "51," the template identifier is "osType," the template version is "1," and the three-dimensional category descriptor includes a nested string ("changeType-1-0_1"), another category having a value "0," and another nested string ("changeType-1-0_1"). The parent string indicates a template identifier of "osType" corresponding to version 1 of that template, which can correspond to Table 5. In this example, however, the "severity" template may be shown in Table 7 below:

TABLE 7

| High | Medium | Low |
|---|---|---|
| 0 (No Change)<br>changeType-1 | 0 (No Change)<br>changeType-1 | 0 (No Change)<br>changeType-1 |

Table 7 includes a reference to another template, "changeType" version 1, which may be described in Table 8 below:

TABLE 8

| Metadata | Logic |
|---|---|
| 0 (No Change)<br>1 (Change) | 0 (No Change)<br>1 (Change) |

Thus, the severity table is used to determine whether there is a change in each category ("High," "Medium," and "Low"), and if there is a change (as indicated by the value "changeType-1" (which is also the name of the sub-template), rather than the value of "0"), then the sub-template "changeType" describes whether the change is to the metadata or to the logic of code modules in the IC package. Accordingly, using nested strings, the severity and type of change can be determined. For example, an entity may set criteria that stipulate that an update is bypassed if the change is only to the metadata, or can further stipulate that the change will be accepted if the change is a "high" change to the metadata, etc.

Another IC package template is shown in Table 9 below:

TABLE 9

| Detection/ Remediation | Product | Lifecycle Status | Rules/ Logic | Precondition |
|---|---|---|---|---|
| 0 (No Change) | 0 (No Change) | 0 (No Change) | 0 (No Change) | 0 (No Change) |
| 1 (Change) | 1 (Change) | 1 (Change) | 1 (Change) | 1 (Change) |
| 2 (Work-around) | 2 (Added) | 2 (Published) | 2 (Rule Change) | 2 (Rule Change) |
| 3 (Instructions) | 3 (Removed) | 3 (Verified) | 3 (Logic Change) | 3 (Logic Change) |
| 4 (Metadata) | | 4 (Internal) | 4 (Minor) | 4 (Minor) |
| 5 (Minor) | | 5 (In Progress) | | |
| 6 (Major) | | 6 (Obsolete) | | |

As shown in the template described by Table 9, a version string can include five dimensions (Detection/Remediation, Product, Lifecycle Status, Rules/Logic, and Precondition). The Detection/Remediation category can include values ranging from 0 to 6, which can indicate whether there is no change, a change, a workaround, a change to instructions, a change to metadata, a minor change, or a major change. Similarly, the Product category can indicate whether there is no change, a change, a change that adds a feature, or a change that removes a feature. The Lifecycle Status category can indicate a status of the component, such as no change, a change, a published status, a verified status, an internal status, an in-progress status, or an obsolete status. The Rules/Logic category can describe changes to the rules and logic for issue detection and remediation modules, and can indicate whether there is no change, a change, a rule change, a logic change, or a minor change. The Precondition category can describe a precondition for executing a code module, and can indicate whether there is no change, a change, a rule change, a logic change, or a minor change. Thus, this template can support a version string that describes an update to an IC package in a highly-granular manner, while ensuring that the version string itself is succinct.

In some embodiments, hashing techniques may be employed to enable a version of a component to be compared to any other version of the component using the same template to determine if there are any changes, including changes between versions in which portions of the component are changed and then changed back again to an original state. An n-dimensional version string with hashing can replace the binary or enumerated values for categories with cryptographic hashes. For example, whereas a standard string may be "BPP@23-osType-1_1_0"), an equivalent hashed version may be BPP@23-osType-1-cf4f837_e842324. The corresponding template can define which fields in the object belong to which categories using a hierarchy within a document (e.g., a JavaScript® Object Notation ("JSON") document). Thus, complex components can be quickly evaluated to determine if a given category of interest has changed. For example, a template can be created in which one category of interest is IC rules, and a particular path of the template (e.g., "signatures.Rules") can be hashed. By accordingly hashing different portions of a document, a template can be created such as the template in Table 10 below:

TABLE 10

| Network | Other |
|---|---|
| cf4f837 | e842324 |

Accordingly, any differences in hashes will indicate a change to any section (e.g., path) of interest in a document. Any combination of document hierarchy and regular expressions can be combined to create a hash for arbitrarily-complex sets of data in order to evaluate categories of interest.

Document-type templates, such as JSON templates, may provide schemas that indicate hierarchies for determining features using a combination of a template and any sub-template. Using structured template definitions, templates can thus be defined that mix change bits, values, and nested templates.

Still referring to FIG. 4 for description of the method 400, criteria for deploying the component are obtained at operation 430. The criteria are defined by an entity, and can include any specific rules for accepting or rejecting a component based on its features that are determined using its template. These rules can be based on the type of change and/or the degree of change. In some embodiments, the criteria can reference other criteria; for example, a criterion may stipulate that a component should be rejected if that criterion is not met unless another particular criterion is satisfied.

Operation 440 determines whether the features satisfy the criteria. Using a list of features obtained by analyzing an n-dimensional string against its template (and any sub-templates, if relevant), each criterion can be evaluated to determine whether the component should be authorized for deployment (i.e., installed and/or executed) or rejected. Thus, the component is authorized at operation 450 if the criteria are satisfied, or the component is rejected at operation 460 if the criteria are not satisfied. Accordingly, a component such as an IC package can be analyzed to evaluate any qualitative and/or quantitative changes to features of the component, and be selectively deployed to entities based on their specified criteria. Method 400 can be performed against of group of entities having different criteria, and a component may only be deployed to a subset of one or more entities whose criteria are satisfied.

Figure 5A:
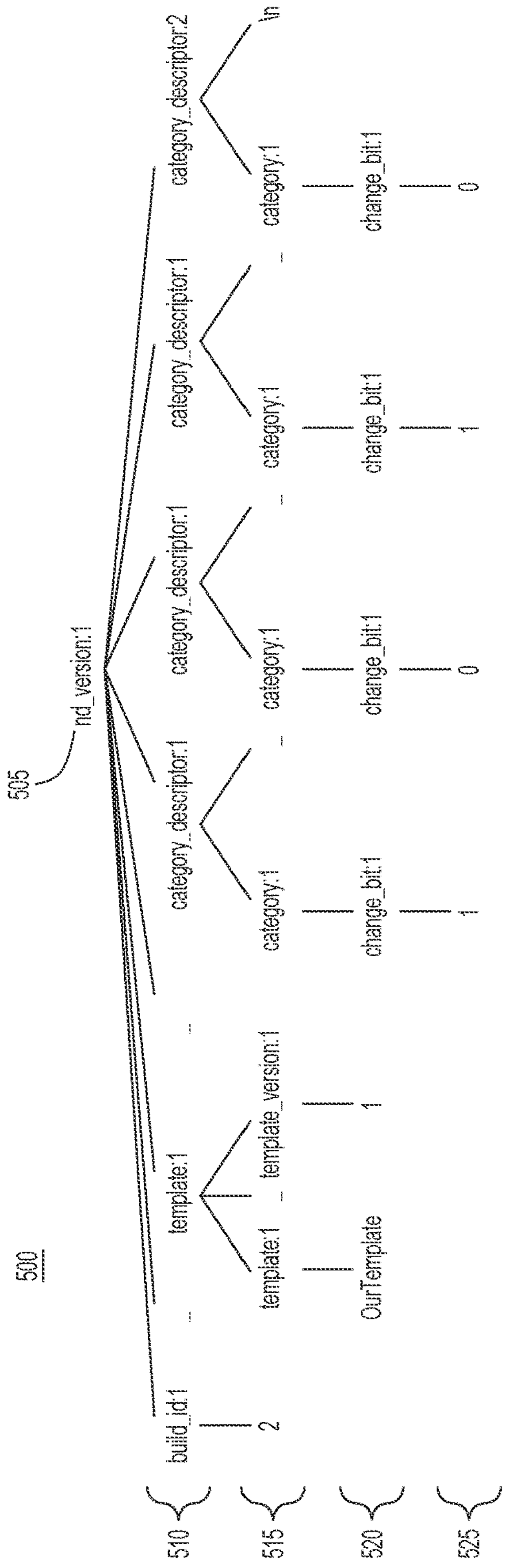
FIGS. 5A and 5B are tree diagrams indicating a hierarchical relationship between features of a component that are indicated using a version string, according to an example embodiment.
Figure 5B:
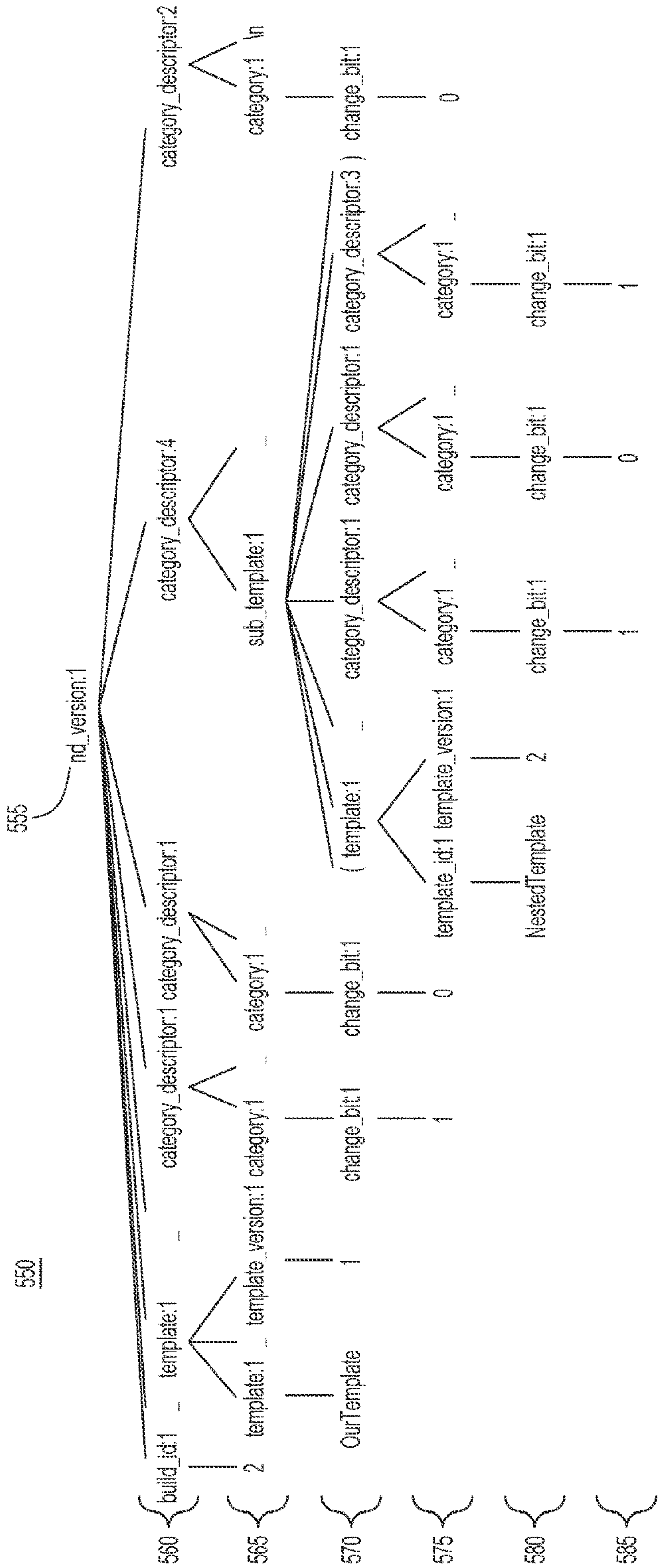

FIGS. 5A and 5B are abstract syntax tree (AST) diagrams indicating a hierarchical relationship between features of a component that are indicated using a version string, according to an example embodiment. With reference first to FIG. 5A, AST 500 is shown, which may correspond to a version string of "OurProduct@2-OurTemplate-1-1_0_1_0." In some embodiments, a version string may include some elements that do not necessarily involve analysis in order to evaluate the version string for a particular use-case. AST 500 may be generated using a parser that is provided with grammar for generating ASTs using version strings as input.

As depicted, AST 500 includes hierarchical level 505 as a top level that describes the version string in its entirety. Hierarchical level 510 includes the build identifier ("build_id1"), template identifier and ("template:1"), category various descriptors (e.g., "category_descriptor:1"); hierarchical level 515 describes aspects of each element included in hierarchical level 510, and hierarchical levels 520 and 525 each further describe aspects of their parent elements, as depicted. For example, the template is version 1, and the template is named "OurTemplate." Each category descriptor has the category and change bits (e.g., the values for each category, which are either "1" or "0" in this example) illustrated at hierarchical level 525.

With the version thus separated into its constituent elements in AST 500, a system can look up the template based on the template identifier and template version. Using the template, the category descriptor values can be compared to determine the meaningful categories for a particular use-case. For example, if a use-case is only concerned with categories 2 and 3, then that entity may adopt this release version as there is a change in category 3 based on the "change_bit:1" value of "1" in hierarchical level 525. However, if an entity is only concerned with categories 2 and 4, the entity may skip this release since there are no changes to those categories.

With reference now to FIG. 5B, AST 550 is shown, which may correspond to a version string of "OurProduct@2-OurTemplate-1-1_0_(NestedTemplate-2-1_0_1)_0" that includes a nested template. Below the top hierarchical level 555, Hierarchical level 560 includes the build identifier ("build_id1"), template identifier ("template:1"), and various category descriptors (e.g., "category_descriptor:1", etc.); hierarchical level 565 describes aspects of each element included in hierarchical level 560, and hierarchical levels 570, 575, 580, and 585 each further describe aspects of their parent elements, as depicted. For example, the template is version 1, and the template is named "OurTemplate." Each category descriptor has the category and change bits (e.g., the values for each category, which are either "1" or "0" in this example) illustrated at hierarchical level 575 for the top-level version string, and hierarchical level 585 for the nested string. Using updated grammar for the parser, a version string with a nested version string can be processed to additionally fetch the values (e.g., change bits) using the sub-template, thus generating AST 550 that includes a holistic view of all of the features of this version of a component.

Figure 6:
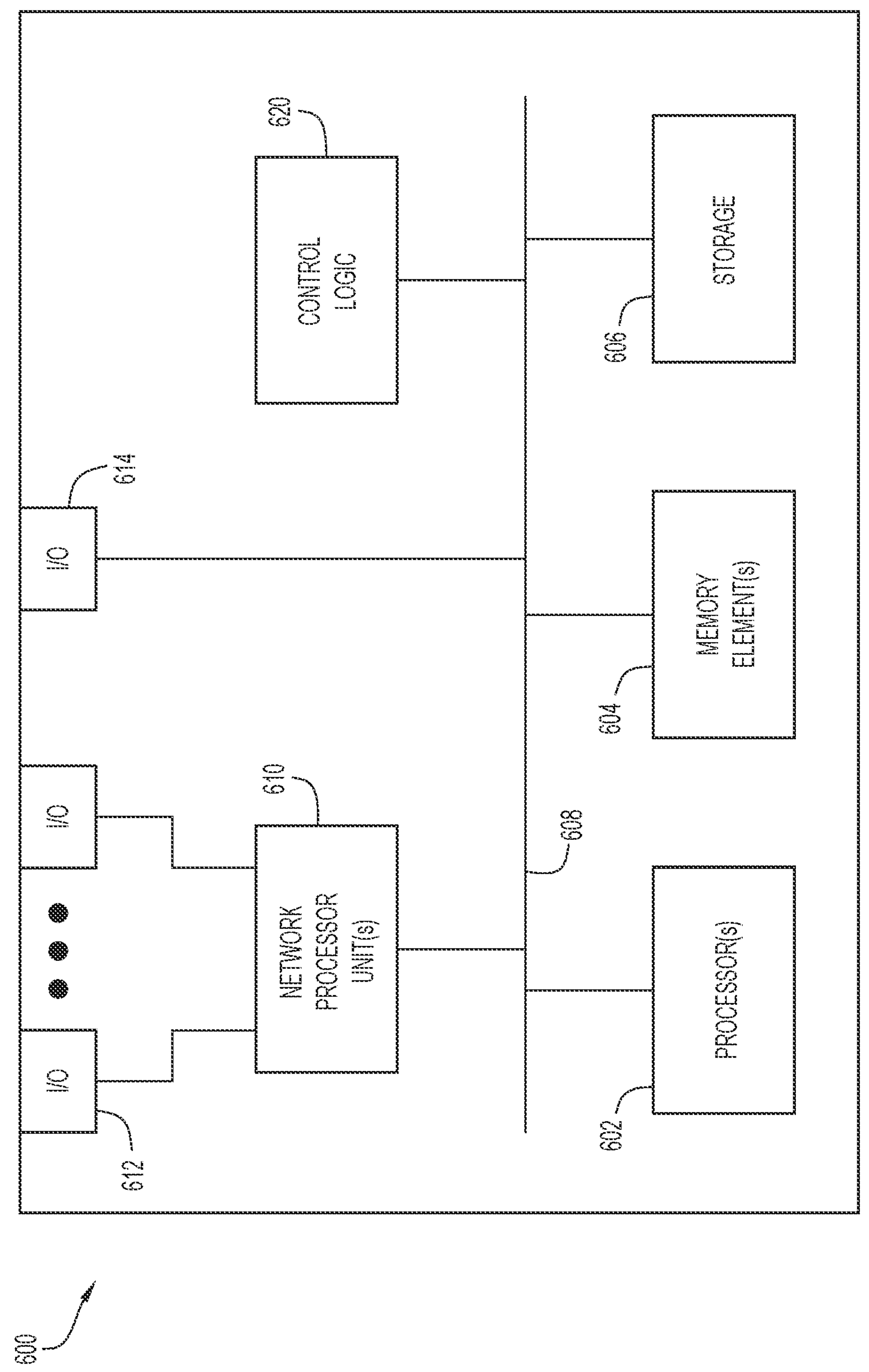
FIG. 6 is a block diagram of a device that may be configured to perform operations relating to selective deployment of components, as presented herein.

Referring now to FIG. 6, FIG. 6 illustrates a hardware block diagram of a computing device 600 that may perform functions associated with operations discussed herein in connection with the techniques depicted in FIGS. 1-5. In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O 614 allow for input and output of data and/or information with other entities that may be connected to computing device 600. For example, I/O 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 602.11 (e.g., Wi-Fi®/Wi-Fi6®), IEEE 602.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a computer-implemented method including: obtaining an n-dimensional string that describes a version of a component, wherein a value for each dimension describes a particular feature of the component; analyzing the n-dimensional string using a template to determine each feature of the component; and determining whether to deploy the version of the component based on the analyzing and based on criteria related to one or more features of the component.

In some aspects, the techniques described herein relate to a computer-implemented method, wherein determining whether to deploy the version of the component includes: receiving criteria related to the one or more features from a plurality of entities; identifying one or more entities having criteria that are satisfied by determined features of the component; and deploying the component to the one or more entities.

In some aspects, the techniques described herein relate to a computer-implemented method, wherein the template indicates one or more of: a presence of each feature, an absence of each feature, a type of each feature, and a change for each feature.

In some aspects, the techniques described herein relate to a computer-implemented method, wherein the component includes a software module.

In some aspects, the techniques described herein relate to a computer-implemented method, wherein the component includes a package of issue identification and remediation modules.

In some aspects, the techniques described herein relate to a computer-implemented method, wherein the component is deployed to one or more computing devices or networking devices of a networking or computing environment.

In some aspects, the techniques described herein relate to a computer-implemented method, wherein the n-dimensional string includes a template identifier that identifies the template for determining each feature of the component.

In some aspects, the techniques described herein relate to a computer-implemented method, wherein the n-dimensional string includes a nested n-dimensional string including a nested template that is used to determine features corresponding to a nested set of values.

In some aspects, the techniques described herein relate to a computer-implemented method, wherein the n-dimensional string further indicates a first version and a second version of the component, and wherein the n-dimensional string indicates differences between the first version and the second version.

In some aspects, the techniques described herein relate to a system including: one or more computer processors; one or more computer readable storage media; and program instructions stored on the one or more computer readable storage media for execution by at least one of the one or more computer processors, the program instructions including instructions to: obtain an n-dimensional string that describes a version of a component, wherein a value for each dimension describes a particular feature of the component; analyze the n-dimensional string using a template to determine each feature of the component; and determine whether to deploy the version of the component based on the analyzing and based on criteria related to one or more features of the component.

In some aspects, the techniques described herein relate to a system, wherein the instructions to determine whether to deploy the version of the component include instructions to: receive criteria related to the one or more features from a plurality of entities; identify one or more entities having criteria that are satisfied by determined features of the component; and deploy the component to the one or more entities.

In some aspects, the techniques described herein relate to a system, wherein the template indicates one or more of: a presence of each feature, an absence of each feature, a type of each feature, and a change for each feature.

In some aspects, the techniques described herein relate to a system, wherein the component includes a software module.

In some aspects, the techniques described herein relate to a system, wherein the component includes a package of issue identification and remediation modules.

In some aspects, the techniques described herein relate to a system, wherein the component is deployed to one or more computing devices or networking devices of a networking or computing environment.

In some aspects, the techniques described herein relate to a system, wherein the n-dimensional string includes a template identifier that identifies the template for determining each feature of the component.

In some aspects, the techniques described herein relate to a system, wherein the n-dimensional string includes a nested n-dimensional string including a nested template that is used to determine features corresponding to a nested set of values.

In some aspects, the techniques described herein relate to one or more non-transitory computer readable storage media having program instructions embodied therewith, the program instructions executable by a computer to cause the computer to perform operations including: obtaining an n-dimensional string that describes a version of a component, wherein a value for each dimension describes a particular feature of the component; analyzing the n-dimensional string using a template to determine each feature of the component; and determining whether to deploy the version of the component based on the analyzing and based on criteria related to one or more features of the component.

In some aspects, the techniques described herein relate to one or more non-transitory computer readable storage media, wherein the program instructions for determining whether to deploy the version of the component cause the computer to: receive criteria related to the one or more features from a plurality of entities; identify one or more entities having criteria that are satisfied by determined features of the component; and deploy the component to the one or more entities.

In some aspects, the techniques described herein relate to one or more non-transitory computer readable storage media, wherein the template indicates one or more of: a presence of each feature, an absence of each feature, a type of each feature, and a change for each feature.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

obtaining an n-dimensional string that describes a version of a component, wherein a value for each dimension describes a particular feature of the component, and wherein the n-dimensional string indicates one or more differences between the version of the component and another version of the component;

analyzing the n-dimensional string using a template to determine each feature of the component;

determining whether to deploy the version of the component based on the analyzing and based on criteria related to one or more features of the component; and automatically instantiating, based on the determining, a deployment module that deploys the version of the component to one or more computing devices or one or more networking devices or skips a deployment of the version of the component.

2. The computer-implemented method of claim 1, wherein determining whether to deploy the version of the component comprises:

receiving criteria related to the one or more features from a plurality of entities; and identifying one or more entities having criteria that are satisfied by determined features of the component.

3. The computer-implemented method of claim 1, wherein the template indicates one or more of: a presence of each feature, an absence of each feature, a type of each feature, and a change for each feature.

4. The computer-implemented method of claim 1, wherein the component comprises a software module.

5. The computer-implemented method of claim 1, wherein the component comprises a package of issue identification and remediation modules.

6. The computer-implemented method of claim 1, wherein the one or more computing devices or the one or more networking devices are located in a networking or computing environment.

7. The computer-implemented method of claim 1, wherein the n-dimensional string includes a template identifier that identifies the template for determining each feature of the component.

8. The computer-implemented method of claim 1, wherein the n-dimensional string includes a nested n-dimensional string including a nested template that is used to determine features corresponding to a nested set of values.

9. The computer-implemented method of claim 1, wherein the n-dimensional string includes a product name or a category descriptor.

10. A system comprising:

one or more computer processors;

one or more computer readable storage media; and program instructions stored on the one or more computer readable storage media for execution by at least one of the one or more computer processors, the program instructions comprising instructions to operations including:

obtain an n-dimensional string that describes a version of a component, wherein a value for each dimension describes a particular feature of the component, and wherein the n-dimensional string indicates one or more differences between the version of the component and another version of the component;

analyze the n-dimensional string using a template to determine each feature of the component;

determine whether to deploy the version of the component based on the analyze operation and based on criteria related to one or more features of the component; and automatically instantiate, based on the determine operation, a deployment module that deploys the version of the component to one or more computing devices or one or more networking devices or skips a deployment of the version of the component.

11. The system of claim 10, wherein the instructions to determine whether to deploy the version of the component comprise instructions to:

receive criteria related to the one or more features from a plurality of entities; and identify one or more entities having criteria that are satisfied by determined features of the component.

12. The system of claim 10, wherein the template indicates one or more of: a presence of each feature, an absence of each feature, a type of each feature, and a change for each feature.

13. The system of claim 10, wherein the component comprises a software module.

14. The system of claim 10, wherein the component comprises a package of issue identification and remediation modules.

15. The system of claim 10, wherein the one or more computing devices or the one or more networking devices are located in a networking or computing environment.

16. The system of claim 10, wherein the n-dimensional string includes a template identifier that identifies the template for determining each feature of the component.

17. The system of claim 10, wherein the n-dimensional string includes a nested n-dimensional string including a nested template that is used to determine features corresponding to a nested set of values.

18. One or more non-transitory computer readable storage media having program instructions embodied therewith, the program instructions executable by a computer to cause the computer to perform operations including:

obtaining an n-dimensional string that describes a version of a component, wherein a value for each dimension describes a particular feature of the component, and wherein the n-dimensional string indicates one or more differences between the version of the component and another version of the component;

analyzing the n-dimensional string using a template to determine each feature of the component;

determining whether to deploy the version of the component based on the analyzing and based on criteria related to one or more features of the component; and automatically instantiating, based on the determining, a deployment module that deploys the version of the component to one or more computing devices or one or more networking devices or skips a deployment of the version of the component.

19. The one or more non-transitory computer readable storage media of claim 18, wherein the program instructions for determining whether to deploy the version of the component cause the computer to:

receive criteria related to the one or more features from a plurality of entities; and identify one or more entities having criteria that are satisfied by determined features of the component.

20. The one or more non-transitory computer readable storage media of claim 18, wherein the template indicates one or more of: a presence of each feature, an absence of each feature, a type of each feature, and a change for each feature.

* * * * *